United States Patent

[11] 3,626,510

| [72] | Inventors | James J. Kauzlarich<br>University of Virginia School of<br>Engineering and Applied Science<br>Department of Mechanical Engineering,<br>Charlottesville, Va. 22901;<br>Richard D. Rheutan, Jr., 206 Mellwood<br>Ln., Richmond, Va. 23229 |
|------|-----------|---|
| [21] | Appl. No. | 69,727 |
| [22] | Filed | Sept. 4, 1970 |
| [45] | Patented | Dec. 7, 1971 |

[54] HYDRAULIC BEARING SYSTEM
7 Claims, 2 Drawing Figs.

[52] U.S. Cl. .................................................. 308/1, 308/9
[51] Int. Cl. .................................................. F16c 17/00
[50] Field of Search ......................................... 308/1, 1 A, 9, 168

[56] References Cited
UNITED STATES PATENTS
3,046,795  7/1962  Wilkerson .................. 308/1

*Primary Examiner*—Martin P. Schwadron
*Assistant Examiner*—Frank Susko
*Attorney*—Stowell & Stowell

ABSTRACT: A hydraulic thrust bearing having bearing members with horizontally aligned, spaced bearing surfaces and a liquid completely filling the space between the surfaces. One member is oscillated normal to the bearing surfaces to generate a positive load supporting force in the bearing.

$h = h_0 - a \sin \omega t + \beta$

INVENTOR
JAMES J. KAUZLARICH
RICHARD D. RHEUTAN Jr.

BY Stowell & Stowell

ATTORNEYS

HYDRAULIC BEARING SYSTEM

BACKGROUND OF THE INVENTION

This invention relates generally to thrust bearings and more particularly to a novel hydraulic thrust bearing wherein a positive load supporting force is generated in the bearing.

Thrust bearings find wide utility where axial support for rotating shafts and other mechanical members is required and are generally defined as bearings which are adapted to support axial loads or, in the case of a rotating shaft, loads parallel to the shaft axis.

Among the common types of thrust bearings are the hydrodynamic and hydrostatic bearings which utilize forces imparted in a liquid lubricant to provide load support. In the former bearing, force is generated by rotation of a thrust inducer on one of the bearing members while the latter bearing derives load support by pressurization of the lubricant liquid by external means. Both bearing systems are effective and find wide application in the art; however, the necessity for a thrust inducing member and for rotation of the bearing to generate a load supporting force in the former instance and the requirement for an external pressurizing system in the latter instance involves the possibility of failure of the bearing due to mechanical breakdown of the pressurizing system.

A more recent development in thrust bearings is the gas squeeze bearing wherein parallel bearing surfaces are separated by a gas film and load support for the bearing is generated by axial oscillation of one of the surfaces at a high frequency. Such bearings are described in greater detail in the article "Gas Bearings," S. Grey, Machine Design, Apr. 25, 1968. The equations for compressible or gas squeeze films are developed in the article "Compressible Squeeze Films and Squeeze Bearings," E. O. Sabbu, Transactions of the ASME, Journal of Basic Engineering, June 1964. In the latter article, Reynolds Equation is used to show that the relative lateral motion between the bearing surfaces produces a nonsymmetrical force per cycle with the greater force occurring on the closing part of the cycle. Such phenomenon is referred to as "pumping action" provided by the high frequency oscillations and is attributable to compression occurring in the compressible gas film. In The Principles of Lubrication by A. Cameron, Wiley, New York, N. Y., 1966, it is pointed out that such bearings work particularly well with "high frequency and/or small clearance because the gas cannot flow out of the bearing space fast enough to avoid compression."

Compressible fluids (e.g., liquids) in squeeze bearings were not heretofore thought to be workable for, on page 392 of the last-mentioned work, Cameron states that the load carried zero if the fluid is an incompressible liquid although it is suggested that cavitation in the liquid may produce gas which will result in a load-carrying capacity.

SUMMARY OF THE INVENTION

This invention relates to a novel thrust bearing employing oscillation and a hydraulic film to produce a load support in the bearing.

The invention further provides a hydraulic thrust bearing which is more reliable than prior art hydrodynamic and hydrostatic thrust bearings by furnishing a hydraulic bearing in which the load support therefor is generated by oscillation of the hydraulic medium in and out of the bearing gap and which will function on a gas medium in the event of loss of the liquid.

The invention still further provides a squeeze type thrust bearing in which the load support is substantially increased over the prior art gas squeeze bearings under usual conditions by furnishing means to utilize a liquid medium to generate load support.

In a preferred embodiment, the invention provides a hydraulic thrust bearing including first and second bearing members having bearing surfaces in parallel relationship to one another; a liquid completely filling the space between the surfaces; means to oscillate at least one of the bearing members normal to the surfaces to cyclically vary the thickness of the space and oscillate the liquid in and out of the bearing gap; and means to positively maintain the space filled with liquid.

These and other objects and advantages of this invention will become better understood by those skilled in the art by reference to the following detailed description when viewed in light of the accompanying drawings wherein like components throughout the figures thereof are indicated by like numerals and wherein:

DESCRIPTION OF A PREFERRED EMBODIMENT

As was stated above, prior art analytical studies of incompressible squeeze films under oscillatory motion have led to the conclusion that a positive net or load-supporting force cannot be generated in such a medium. This conclusion is a result of the initiation of analysis either with the Reynolds equation which neglects inertia or with the Navier-Stokes equation and the assumption that inertia is negligible.

Figure 1:
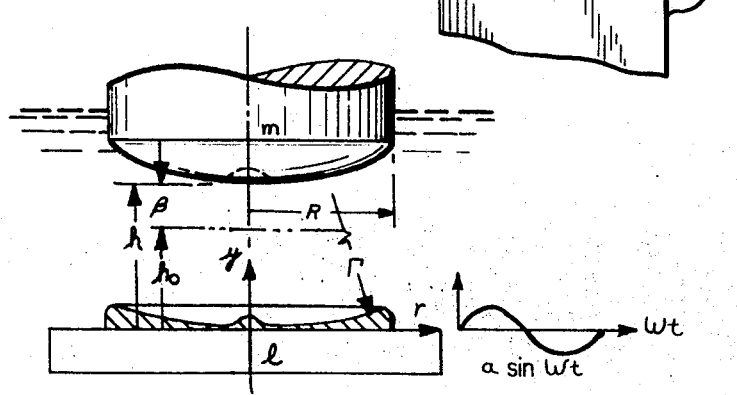
FIG. 1 is an elevational view, partly in section, of a schematic representation of the hydraulic squeeze bearing in accordance with the invention.

In the present invention it has been found that, contrary to prior art theory, a net positive load supporting force can be generated in a squeeze bearing having an incompressible medium between the bearing surfaces. Such force can be analytically explained by taking inertia into account and by use of the continuity equation and the Navier-Stokes equation as follows:

Assuming for purposes of analysis a bearing consisting of a circular, flat, reciprocable plate disposed below a circular flat surface according to the diagram of FIG. 1 where:

$h = h_o - a \sin \omega t + y(t)$
$\dot{h} = -a\omega \cos \omega t + \dot{y}(t)$
$\ddot{h} = a\omega^2 \sin \omega t + \ddot{y}(t)$
$u$=radial fluid velocity
$v$=axial fluid velocity
$a$=vibration amplitude
$r$=radial coordinate
$y$=axial coordinate
$\rho$=fluid density (assumed constant)
$\mu$=fluid viscosity (assumed constant)
$R$=bearing radius
$\Gamma$=bearing curvature ($\infty$ for analysis)
$\omega$=angular velocity
$t$=time
$F$=force
$m$=mass of bearing
$l$=reciprocating member
$\alpha, \alpha'$=initial gap
$\beta$=bearing height above reference plane
$p$=pressure
$e$=amplitude-gap ratio=$a/h_o$
$g_c$=conversion factor—32.2 lbm-ft/lbf-sec$^2$

PRESSURE DERIVATION

Navier-Stokes equation for radial flow:

$$\frac{\partial^2 u}{\partial y^2} = \frac{1}{\mu}\frac{\partial p}{\partial r} + \frac{\rho}{\mu}\left(\frac{\partial u}{\partial t} + u\frac{\partial u}{\partial t} + v\frac{\partial u}{\partial y}\right) - \left(\frac{\partial^2 u}{\partial r^2} + \frac{1}{r}\frac{\partial u}{\partial r} - \frac{u}{r^2}\right) \quad (1)$$

For flow between parallel circular plates the well-known technique of iteration of (1) results in velocity approximations:

$$u = \frac{3r\dot{h}}{h^3}(y^2 - hy) \quad (2)$$

$$v = -\frac{\dot{h}}{h^3}(2y^3 - 3hy^2) \quad (3)$$

Substitution (2) and (3) into (1), integrating and applying boundary conditions:

$$u(r,o,t) = r(r,h,t) = 0 \quad (4)$$

gives:

$$u = \frac{1}{2\mu}\frac{\partial p}{\partial r}(y^2 - hy) + \frac{\rho}{\mu}\left[\frac{3r\dot{h}}{h^3}\left(\frac{y^4}{12} - \frac{hy^3}{6} + \frac{h^3y}{12}\right)\right.$$
$$\left. + \frac{r\dot{h}^3}{h^6}\left(\frac{3}{10}hy^5 - \frac{y^6}{10} - \frac{3}{4}h^2y^4 + h^3y^3 - \frac{9}{20}h^4y\right)\right] \quad (5)$$

From continuity:

$$\int_0^h u\,dy = -\frac{r\dot{h}}{2} \quad (6)$$

Equation (5) is substituted into Equation (6) and solved for the pressure to give:

$$\frac{\partial p}{\partial r} = 6\frac{\mu r\dot{h}}{h^3} + \left(\frac{3}{5}\rho r\frac{\ddot{h}}{h} - \frac{15}{14}\rho r\frac{\dot{h}^2}{h^2}\right) \quad (7)$$

With boundary conditions of:

$p(R,t) = p_o \quad (8)$

Equation (7) is integrated giving:

$$p - p_o = \frac{r^2 - R^2}{2g_o}\left(6\mu\frac{\dot{h}}{h^3} + \frac{3}{5}\rho\frac{\ddot{h}}{h} - \frac{15}{14}\rho\frac{\dot{h}^2}{h^2}\right) \quad (9)$$

The total squeeze film force due to pressure, utilizing Equation (9), is found to be:

$$F_D = 2\pi\int_0^R r(p - p_o)\,dr \quad (10)$$

$$= -\frac{\pi R^4}{4g_o}\left(6\mu\frac{\dot{h}}{h^3} + \frac{3}{5}\rho\frac{\ddot{h}}{h} - \frac{15}{14}\rho\frac{\dot{h}^2}{h^2}\right) \quad (11)$$

Case I: Fixed Upper Bearing Member Where $\beta = 0$

This case is applicable to any design where the upper member is allowed to come to a fixed position in the axial direction, i.e. $\beta = 0$, and will be assumed to apply to the gyroscope device to be described subsequently.

Substituting for $h$, $\dot{h}$, and $\ddot{h}$ into Equation (11):

$$F_D = \frac{\pi R^4}{4g_o}\left[6\mu\frac{e\omega\cos\omega t}{h_o^2(1 - e\sin\omega t)^3} - \frac{3}{5}\rho\frac{e\omega^2\sin\omega t}{(1 - e\sin\omega t)}\right.$$
$$\left. + \frac{15}{14}\rho\frac{e^2\omega^2\cos^2\omega t}{(1 - e\sin\omega t)^2}\right] \quad (12)$$

To find the average force per cycle a substitution of the following terms puts Equation (12) into the form of Sommerfeld integrals as follows:

Let
$\omega t = \Phi - \pi/2 \quad (13)$
then:
$\sin\omega t = -\cos\Phi \quad (14)$
$\cos\omega t = \sin\Phi \quad (15)$
$d(\omega t) = d\Phi \quad (16)$ Equation (12) may be substituted into Equation (17) along with Equations (13) through (16) as follows:

$$2\pi\overline{F}_H = \int_0^{2\pi} F_D\,d(\omega t) \quad (17)$$

$$\overline{F}_H = \frac{R^4}{8g_o}\int_0^{2\pi}\left[\frac{6\mu e\omega}{h_o^2}\frac{\sin\varphi}{(1 + e\cos\varphi)^3} + \frac{3}{5}\rho e\omega^2\frac{\cos\varphi}{(1 + e\cos\varphi)}\right.$$
$$\left. + \frac{15}{14}\rho e\omega^2\frac{\sin^2\varphi}{(1 + e\cos\varphi)^2}\right]d\varphi \quad (18)$$

The Sommerfeld integrals are:

$$\int_0^{2\pi}\frac{\sin\varphi\,d\varphi}{(1 + e\cos\varphi)^2} = \frac{2\pi}{e^2\sqrt{1 - e^2}} - \frac{2\pi}{e^2} \quad (19)$$

$$\int_0^{2\pi}\frac{\cos\varphi\,d\varphi}{(1 + e\cos\varphi)} = \frac{2\pi}{e} - \frac{2\pi}{e\sqrt{1 - e^2}} \quad (20)$$

$$\int_0^{2\pi}\frac{\sin\varphi\,d\varphi}{(1 + e\cos\varphi)^3} = 0 \quad (21)$$

Substitution Equations (19), (20) and (21) into Equation (18):

$$\overline{F}_H = \frac{33\pi}{280g_o}\rho\omega^2 R^4\left(\frac{1}{\sqrt{1 - e^2}} - 1\right) \quad (22)$$

Through subsequent experimental verification, it was found that the above relationship is substantiated within design requirements.

Contrary to what has been suggested in the prior art, a limit to the functioning of the hydraulic squeeze bearing of this invention is cavitation in the liquid. It is estimated that cavitation onset will occur at zero radius in the fluid between the bearing surfaces when the pressure drops to the vapor pressure of the liquid. Assuming a zero vapor pressure an equation for cavitation can be calculated from Equation (9) after substitution for $h$, $\dot{h}$, and $\ddot{h}$, giving:

$$p - p_o = \frac{r^2 - R^2}{2g_o}\left[\frac{6\mu}{h_o^2}\frac{e\omega\cos\omega t}{(1 - e\sin\omega t)^3} - \frac{3}{5}\rho\frac{e\omega^2\sin\omega t}{(1 - e\sin\omega t)}\right.$$
$$\left. - \frac{15}{14}\rho\frac{e^2\omega^2\cos^2\omega t}{(1 - e\sin\omega t)^2}\right] \quad (23)$$

Letting $r = 0$ $\omega t = \frac{\pi}{2}$ in.

Equation (23) results in an equation giving the lowest pressure bearing during any cycle of operation. Furthermore, assuming that cavitation will not occur until the absolute pressure is zero, it is possible to solve for the frequency which will produce cavitation by letting $p = 0$.

The calculation gives:

$$\omega_{cavitate}^2 = \frac{10p_o g_o}{3\rho R^2}\left(\frac{1}{e} - 1\right) \quad (24)$$

Thus, Equation (24) is a means for estimating the external pressure, $p_o$, required to avoid cavitation.

From Equation (22) it is seen that the most desirable incompressible fluids for the purpose of lubricant in this invention should have high density and, since cavitation in the fluid should be avoided, as was discussed above, the fluid should have low vapor pressure. Equation (22) also dictates that, within cavitation producing limits discussed above, the bearing should be operated at as high a frequency as possible. Also, Equation (22) dictates that the ratio of oscillational amplitude to mean separation, $e = a/h_o$, should be as large as possible.

Case II: Free Upper Bearing Member, where $\beta(t) \neq 0$

It is conceived that there are conditions where the upper bearing member, $m$, will not operate in a fixed position, but will be free to move in accordance with constraints of gravity and/or a spring and damping device. This condition requires analysis where $\beta = f(t)$.

In such case, the previously derived equations for pressure (9) and force (11) still apply.

Assuming the upper member, $m$, is spring loaded with spring constant $k$ and damped, with damping constant $c$, the equation of motion for $m$ can be written:

$$m\ddot{\beta}+c\dot{\beta}+i\beta=F_p \qquad (25)$$

Substituting for $\beta$, $\dot{\beta}$, and $\ddot{\beta}$, with Equation (11) for $F_p$, and collecting terms, gives:

$$\left(m+\frac{3\pi\rho R^4}{20h}\right)\ddot{h}+\left(c+\frac{6\pi\mu R^4}{4h^3}\right)\dot{h}-\frac{15\pi\rho R^4}{56h^2}\dot{h}^2+k(h-h_o)$$
$$=(ma\omega^2-ka)\sin\omega t - ca\omega\cos\omega t \qquad (26)$$

Equation (26) is a nonlinear differential equation which must be solved by means of analog or digital computer. Results of analog computer calculation generally confirm the load-carrying capacity of the hydraulic squeeze bearing under this set of conditions.

Design Application

Figure 2:
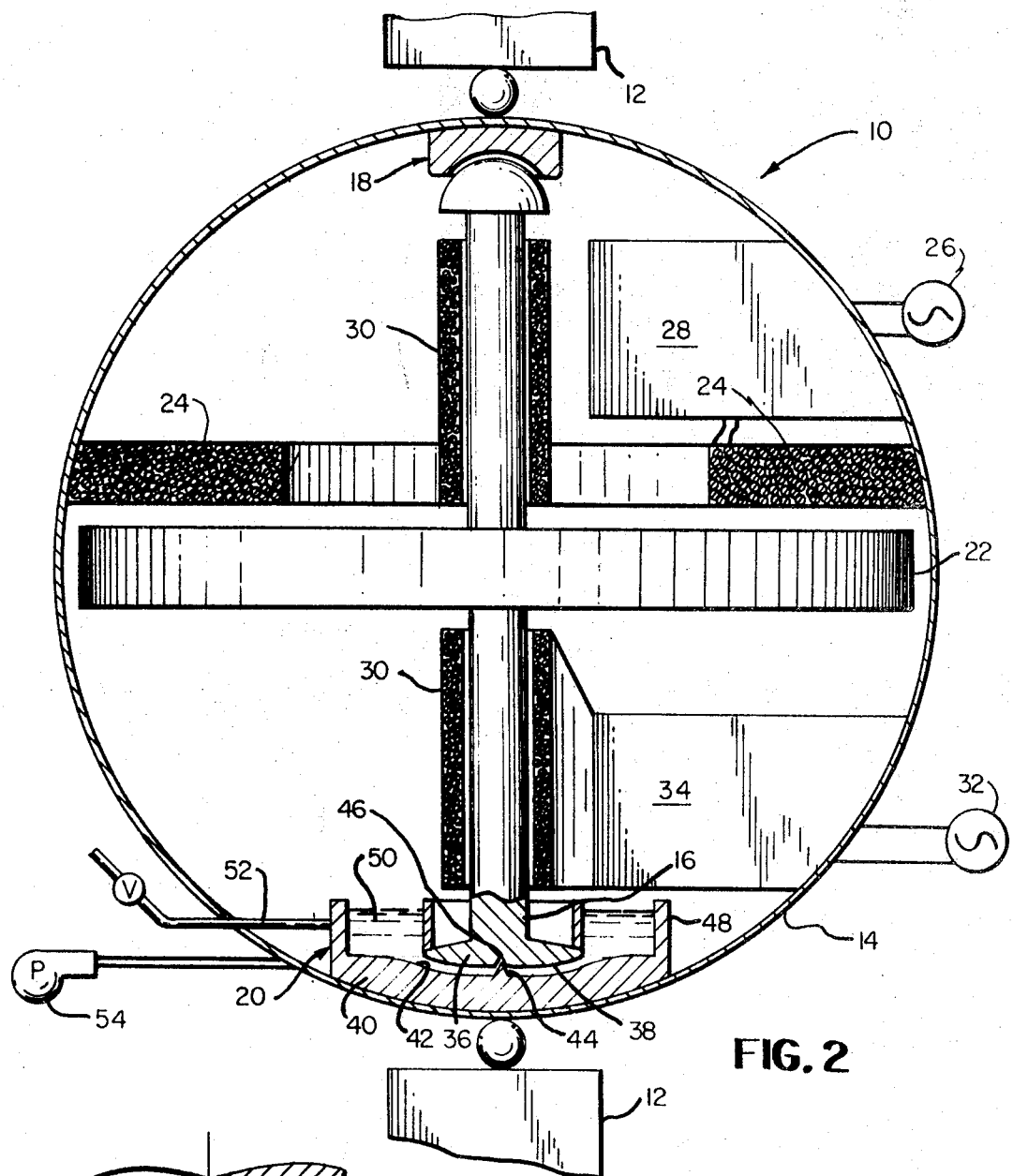
FIG. 2 is an elevational view, partly in section, of a device embodying a hydraulic squeeze in accordance with the invention.

The bearing of the invention, as described generally above, has been theoretically applied to a gyroscopic device shown in FIG. 2, where the theory of Case I is applicable.

Referring now to FIG. 2, the gyroscope 10 is mounted on gimbals 12 as is common in the art. The gyroscope is enclosed in a pressure vessel 14 to provide pressurization of the liquid lubricant as described above.

The gyroscope consists of a rotatable shaft 16 mounted in upper and lower bearings, shown generally at 18 and 20 respectively, and supporting a rotor 22 which serves as a gyroscopic mass and motor armature as is known in the art. An annular induction motor coil 24 is disposed around the shaft 16 surjacent the rotor 22 and, when energized with alternating current from a source 26 through an induction motor drive control circuit 28, serves to drive the rotor 22 at a speed determined by the control 28 as is well known in the art.

The upper bearing 18 constitutes a gas squeeze bearing of the type described in the above-referred-to publications and functions in the manner described therein to provide rotative support for the shaft 16 at the upper end thereof.

A tubular drive coil 30 is disposed around the lower and upper portion of the magnetostrictive shaft 16 and serves, when supplied with alternating current from a source 32 through an RLC circuit oscillator 34, to oscillate the shaft in an axial direction at an amplitude and frequency determined by design of the oscillator 34 as is well known in the art.

The bearing 20 comprises an upper bearing member 36 mounted on the lower end of the shaft 16 and having a bearing surface 38. A lower bearing member 40 is provided with a bearing surface 42 subjacent and in spaced parallel relationship to the surface 38. As seen in the drawing, the surface 38 is convex while the surface 42 is correspondingly concave, the surface being blended into the surrounding areas of the members 36 and 40 by means of rounded transitional surfaces to avoid sharp corners and thereby preclude cavitation producing eddies which may be generated thereby.

The purpose of the radius of curvature of the surface 38 is to provide radial thrust capacity and stability. Although it was assumed the surfaces to be flat, $\Gamma \to \infty$, for purposes of theoretical analysis, the actual embodiment of the design is conceived to have some curvature to the bearing surfaces, with the theory being generally applicable without serious modification until the radius of curvature is relatively small in comparison to other dimensions. The surfaces 38 and 42 may be configures other than the convex-concave arrangement illustrated if so desired.

A mechanical spacing means comprising an upstanding stud or pivot 44 and recess 46 centered in the surfaces 42 and 38 respectively, serves to provide an initial minimum clearance between the surfaces, but is not contacting while the bearing is in operation. The purpose of the pivot and recess, 44 and 46, is to insure that the bearing does not come to rest on the bearing seat, but a gap is maintained when the bearing is not operating. On starting the oscillation of the bearing the upper member will rise off the pivot point 44 and not come into contact during operation. If $h_o$ were initially zero, the bearing may not be able to rise to its operating position since liquid may not be able to enter the bearing gap.

An upstanding wall 48 is formed around the surface 42 to provide a reservoir means for lubricant liquid 50 which completely fills the space between the surfaces 38 and 42. The liquid 50 may be of any type compatible with the environment, however, a liquid having low-vapor pressure and high density is preferred for this purpose. Means other than the open reservoir illustrated, such, for example, as a closed housing supplied by an outside reservoir, will also be suitable, so long as an ample supply of liquid to the space between the surfaces 38 and 42 is assured at all times. In the embodiment illustrated, the liquid 50 can be replenished as needed through a conduit 52.

The vessel 14 is communication with a source of pressure 54 which provides means to pressurize the interior thereof for pressurization of the liquid 50 as required.

In an experimental device constructed in accordance with this invention, a 1 inch diameter bearing driven $(\omega)$ at 3,120 r.p.m. and at a setting $(h_o)$ of 3/32 inch and $(a)$ of 1/64 inch amplitude of vibration with SAE LOW oil produced a net positive force per cycle on the order of 1.0 $1b_f$.

Utilizating Equation (22) in the present invention with the following parameters for the lower bearing 20:

$e=a/h_o=1/5$
$\rho=57$ $lbs_m/ft^3$
$\omega=9.8\times10^3$ rad/sec
$R=1/24$ ft then the load carrying capacity of the hydraulic bearing thereof is:

$$F_H=\frac{33\pi}{280g_o}\rho\omega^2 R^4\left(\frac{1}{\sqrt{1-e^2}}-1\right)=3.8 \text{ lbs.}$$

The following equation:

$$p_o=\frac{3\rho R^2\omega^2}{10(1/e-1)g_o}$$

indicates that the pressure required in the liquid 50 to avoid cavitation is:

$$p_o=150 \text{ p.s.i.a.}$$

The upper bearing 18 which constitutes a known type of gas squeeze bearing, develops a load capacity according to the equation from the above-cited Cameron work, p. 395:

$$F_G=1.15\pi p_o R^2\left(\frac{1}{\sqrt{1-e^2}}-1\right) \qquad (27)$$

Using the above parameters, then $$F_G=2.25 \text{ lbs.}$$

Equations (22), and (24) and (27) indicate that the load capacity of the hydraulic squeeze bearing of this invention is significantly greater than that of prior art gas squeeze bearings whenever $e$ is less than about ¼.

In the event of loss of the liquid 20, due to operation in a zero gravity environment or other causes, the hydraulic bearing will obviously continue to operate as a gas squeeze bearing at reduced load capacity.

What has been set forth above is intended as exemplary of a teaching in accordance with the invention to enable those skilled in the art in the practice thereof and, within the scope of the appended claims, the invention may be practices other than as specifically described. For example, the bearings 18 and 20 may be oscillated by means of a piezo-electric or mechanical cam type oscillator rather than the oscillator described if so desired. In addition to the gyroscope installation disclosed, the bearing 20 may also be used in other devices where hydrostatic, hydrodynamic or other types of thrust bearings now find utility.

What is new and desired to be protected by Letters Patent of the United States is: We claim:

1. A hydraulic thrust bearing comprising:
   a first bearing member having a bearing surface;
   a second bearing member having a bearing surface parallel to and spaced from said first bearing surface;
   a liquid completely filling the space between said bearing surfaces;
   means to oscillate at least one of said bearing members normal to said bearing surfaces to cyclically vary the thickness of said space and oscillate said liquid in and out;
   supply means to positively maintain said space filled with liquid;
   whereby a positive load supporting force is generated in said bearing by the oscillation of said liquid; and
   means to pressurize said liquid to preclude cavitation therein.

2. A bearing in accordance with claim 1 wherein said supply means comprises walls defining a reservoir around said bearing surfaces and means to maintain said reservoir filled with said liquid.

3. A bearing in accordance with claim 1 further comprising means to maintain a minimum clearance between said bearing surfaces for start up purposes.

4. A bearing in accordance with claim 1 wherein the bearing surface of one of said members is convex and the corresponding bearing surface of the other of said bearing members is concave.

5. A bearing in accordance with claim 1 wherein said positive load supporting force averages per cycle according to the following relationship:

$$\overline{F}_H = \frac{33\pi}{280 g_o} \rho \omega^2 R^4 \left( \frac{1}{\sqrt{1-e^2}} - 1 \right)$$

where:
   $\overline{F}_H$ = Load Supporting Force, lbs$_f$
   $\rho$ = Liquid Density, lbs$_m$/ft$^3$
   $e$ = oscillation amplitude/mean separation = $a/h_o$
   $\omega$ = Oscillating Frequency, radians/sec.
   $g_c$ 32.2 (lbs$_m$—ft/lbs$_f$—sec$^2$)
   $R$ = Radius of Bearing, ft.

6. A bearing in accordance with claim 1 wherein pressure is applied by said means to pressurize said liquid according to the following relationship:

$$p_o = \frac{3 \rho R^2 \omega^2}{10(1/e - 1) g_o}$$

where:

$p_o$ = pressure applied, lbs$_f$/ft$^2$.

7. A bearing in accordance with claim 2 wherein said first bearing member is disposed on one end of a rotary shaft of magnetostrictive material and wherein said means to oscillate comprises a coil and control means to cyclically impose a magnetic field and longitudinally oscillate said shaft at a desired frequency and amplitude.

* * * * *